United States Patent

Glasson

[15] 3,651,415

[45] Mar. 21, 1972

[54] BIDIRECTIONAL COUNTER

[72] Inventor: Jerry M. Glasson, Skokie, Ill.

[73] Assignee: Teletype Corporation, Skokie, Ill.

[22] Filed: Dec. 21, 1970

[21] Appl. No.: 99,881

[52] U.S. Cl. ....................328/44, 235/92 EV, 235/176, 307/222, 307/238

[51] Int. Cl. ....................H03k 23/24

[58] Field of Search ....................328/44, 159; 307/216, 222, 307/238; 235/92 BN, 92 CP, 92 EV, 92 GT, 168, 176

[56] References Cited

UNITED STATES PATENTS

| | | | |
|---|---|---|---|
| 3,001,711 | 9/1961 | Frohman | 307/216 X |
| 3,192,478 | 6/1965 | Metz | 328/44 |
| 3,292,091 | 12/1966 | Kosanke et al. | 307/238 X |
| 3,354,324 | 11/1967 | Cubert et al. | 307/216 X |
| 3,534,403 | 10/1970 | Matrese | 328/44 X |

*Primary Examiner*—Stanley T. Krawczewicz
*Attorney*—J. L. Landis and R. P. Miller

[57] ABSTRACT

A clock pulse advances a first count into a binary counter, each clock pulse increasing the stored count by one. To subtract one count from the first stored count, the count is inverted and then increased by one count. The increased and inverted count is then re-inverted, resulting in a final stored count which is one count less than the first count.

7 Claims, 3 Drawing Figures

INVENTOR
JERRY M. GLASSON

BY J. L. Landis

ATTORNEY

BIDIRECTIONAL COUNTER

BACKGROUND OF THE INVENTION

The present invention relates to binary counter circuits, and in particular to a circuit which may perform either additive or subtractive counting.

In the present state of the art there are many uses for bidirectional electronic digital counters. For example, in the teletypewriter art wherein characters are printed at predetermined locations in a line of type by a movable type carrier member, it is often necessary to know the exact location of the member along the line of type to determine where the next character will be printed. To obtain such information, a counter having bidirectional capabilities is required, the counter generating one additive count for each advance of the type carrier member along the line of type and providing a subtractive count for each backspacing of the type carrier member along the line of type. Such counters are well known in the art, such as the decimal type counters described in U.S. Pat. No. 3,054,001—Hamilton C. Chisholm, et al.; and U.S. Pat. No. 3,054,060—Thomas H. Thomason, both of which are assigned to Beckman Instruments, Inc. Such counters include one or more decades each having four binary counting units interconnected to selectively count in a forward direction in response to a clock pulse on a first lead and in a backward direction in response to a clock pulse on a second lead. Such counters, however, are complicated and are specifically designed to be capable of both additive and subtractive counting.

An object of the present invention is to provide a circuit and a method for employing a standard binary counter, one capable of counting in the forward direction only, as a bidirectional counter.

SUMMARY OF THE INVENTION

The foregoing and other objects of the invention are accomplished by inverting a first count initially stored in a sequential electronic binary counter, advancing the binary counter one count and inverting the inverted count stored in the counter to obtain a stored count which is one count less than the first count.

Preferably, the binary counter is of the type which advances one count in response to a clock pulse applied thereto and has a plurality of elements each for storing an individual portion of the total binary count stored in the counter, the counter being characterized in that each element has an output for providing a representation of the individual portion of the binary count stored therein and an input for receiving a portion of the binary count to be stored, the counter further having an enabling input for receiving a signal applied thereto, the simultaneous presence of a signal applied to the enabling input and a clock pulse operating to store within the elements of the counter the portion of a binary count being applied to the input thereof. A plurality of inverters are provided, each connected to receive a different one of the outputs and to provide an inverted representation thereof, each inverted representation being applied to the input of the element from which it was obtained. An enabling signal and a clock pulse are then applied to the counter to store within each element the inverted representation of the output of the element. Next, a clock pulse is applied to the counter to advance the counter one count, and the inverted representation of each element is again applied through the inverters to the input of the same element. The final step comprises again simultaneously applying an enabling signal and a clock pulse to the counter to store within each element the inverted representation of the output of the element to obtain a stored binary count within the counter which is one count less than the first count.

Other objects, advantages and features of the invention will be apparent from the following description of a specific embodiment thereof, when taken in conjunction with the appended drawings.

DETAILED DESCRIPTION OF THE INVENTION

Figure 1:
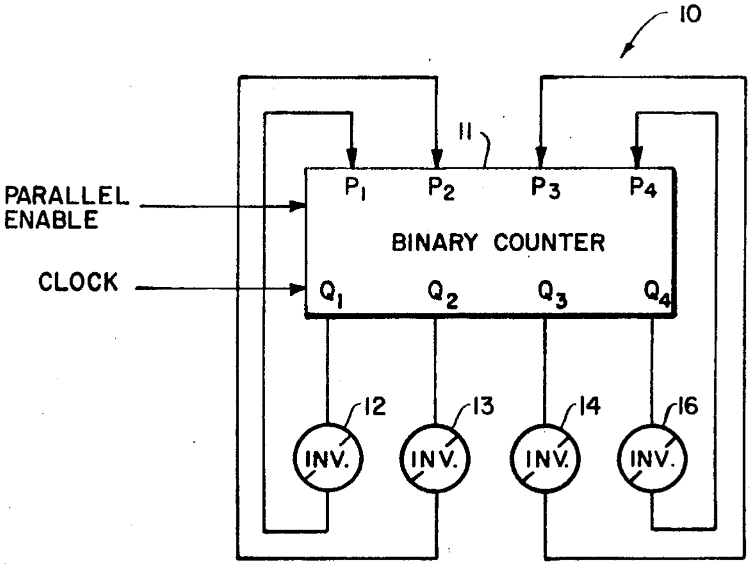
FIG. 1 is a schematic diagram of the preferred embodiment of the circuit of the invention.

The specific embodiment of a bidirectional binary counter 10 shown in FIG. 1 of the drawings includes a binary counter 11 and four inverters 12, 13, 14, and 16. The binary counter 11 is of the Fairchild type 9316 integrated circuit type, and is characterized in that when a parallel enable signal is absent at the counter (+V potential on the parallel enable input lead), an incoming clock pulse (a transition from a zero to a +V potential on the clock input lead) generates within the shift register 11 a sequential binary count, which count is advanced by one count for each clock pulse applied to the binary counter.

The counter 11 is comprised of four individual storage elements, each for storing an individual portion of the total binary count stored within the counter. Each element has an output Q (represented by the outputs $Q_1$ through $Q_4$) at which is provided a representation of the portion of the binary count stored therein. Each element also has an input P (represented by the inputs $P_1$ through $P_4$), and is characterized in that when a clock pulse is applied to the counter 11 simultaneously with a parallel enable input (0 volts on the parallel enable input lead) to the counter, the signal presented to the input P of the element is stored within the element, eliminating any previous portion of a count which was initially stored within the element.

The inverters 12, 13, 14, and 16 are each connected to receive an input from a different element output $Q_1$–$Q_4$, respectively. The outputs from the inverters are applied to the inputs $P_1$–$P_4$ of the elements of the binary counter 11, such that each element receives at its input P an inverted representation of the signal being provided at its output Q. When a clock pulse occurs simultaneously with a parallel enable input, the binary count stored within the counter 11 and being provided at the outputs $Q_1$–$Q_4$ is passed through the inverters 12, 13, 14, and 16, is presented at the inputs $P_1$–$P_4$, and is stored within the counter 11. Therefore, whenever a clock pulse occurs simultaneously with a parallel enable input, the information within the binary counter 11 will be inverted.

Figure 2:
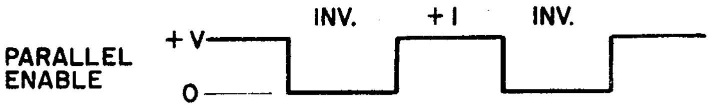
FIG. 2 shows a waveform of the parallel enable signals applied to the circuit of FIG. 1.
Figure 3:
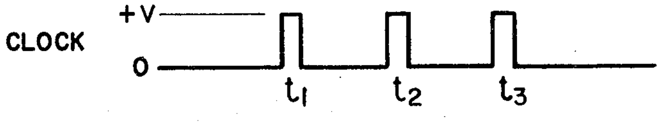
FIG. 3 shows a waveform of the clock pulses applied to the circuit of FIG. 1.

In operation, with the parallel enable input normally at +V volts, a clock pulse advances the binary counter 11, providing for the storage of a binary count therein representative of the number of clock pulses applied thereto. To subtract one count from the stored count, a parallel enable signal and a clock pulse are simultaneously applied to the counter 11 as shown at time $t_1$ in FIGS. 2 and 3 of the drawings, which provides for the storage within the binary counter 11 of a count which is the inversion of the count initially stored in the counter. The parallel enable input is then removed from the counter 11 and one clock pulse is provided (at time $t_2$ in FIGS. 2 and 3) to the counter to advance the counter one binary count. The parallel enable input and the clock pulse are then again simultaneously applied to the counter 11 (at time $t_3$ in FIGS. 2 and 3) to reinvert the binary count stored therein to obtain a final binary count which is one less than the binary count which was initially stored within the circuit before the first inversion.

The operation of the circuit as above described is based upon the mathematical "two's complement" principle, which states that if a binary count is inverted and a count of one is then added to the inverted count which is then reinverted, the final binary count will be one less than the initial count.

While one specific embodiment of the invention has been described in detail, it will be obvious that various modifications may be made from the specific details described without departing from the spirit and the scope of the invention. For example, if it is desired to have a bidirectional binary counter 10, as above described, having more than four storage elements therein, two or more of the circuits 10 may be serially connected to provide as many storage elements as desired.

What is claimed is:

1. A method of subtracting one count from a first count initially stored in a sequential electronic binary counter, which comprises:

inverting the first count initially stored in the counter;

advancing the binary counter one count; and inverting the inverted count stored in the counter to obtain a stored count which is one count less than the first count.

2. The method as recited in claim 1, wherein the binary counter has a plurality of elements each for storing an individual portion of the total binary count stored within the counter and each having an output for providing a representation of the portion of the count stored therein and each having an input for receiving a portion of a count to be stored therein, wherein inverting the count within the counter comprises:

inverting the portion of the count provided at the output of each element to obtain an inverted representation thereof;

applying the inverted representation of the portion of the count stored in each element to the input of the same element; and storing the inverted representations within the elements of the counter.

3. The method as recited in claim 2, wherein the binary counter is of the type which advances one count in response to one clock pulse applied thereto and stores the information being presented to its element inputs in response to both the application of a clock pulse and of an enabling signal applied thereto, wherein storing the inverted representations comprises:

providing the clock pulse and the enabling signal to the binary counter simultaneously.

4. A method of subtracting one count from a first count stored in a sequential electronic binary counter, the binary counter being of the type which advances one count in response to a clock pulse applied thereto and having a plurality of elements each for storing an individual portion of the total binary count stored in the counter, the counter being characterized in that each element has an output for providing a representation of the individual portion of the binary count stored therein and an input for receiving a portion of a binary count to be stored, the counter further having an enabling input for receiving a signal applied thereto, the simultaneous presence of a signal applied to the enabling input and a clock pulse operating to store within the elements of the counter the portions of a binary count being applied to the inputs thereof, which comprises:

providing an inverted representation of the output of each element to the input of the same element;

simultaneously applying an enabling signal and a clock pulse to the counter to store within each element the inverted representation of the output of the element to obtain a stored binary count within the counter which is one count less than the first count.

5. An electronic counter for generating both a higher and a lower count, which comprises:

a binary counter having a first binary count stored therein;

means for inverting the first count in the binary counter;

means for advancing the binary counter one count to advance the inverted count one count; and means for inverting the inverted count stored in the counter to obtain a count which is one less than the first count.

6. The counter as recited in claim 5, wherein the binary counter has a plurality of elements each for storing an individual portion of the total binary count stored within the counter and each having an output for providing a representation of the portion of the count stored therein and each having an input for receiving a portion of a count to be stored therein, wherein the means for inverting comprises:

a plurality of inverters, each connected to receive a different one of the outputs and to provide an inverted representation thereof;

means for applying the inverted representation of the portion of the count stored in each element to the input of the same element; and means for storing the inverted representations within the elements of the counter.

7. The counter as recited in claim 6, wherein the binary counter is of the type which advances one count in response to one clock pulse applied thereto and stores the information being presented to its element inputs in response to both the application of a clock pulse and of an enabling signal applied thereto, wherein the means for storing comprises:

means for providing the clock pulse and the enabling signal to the binary counter simultaneously.

* * * * *